US007129952B2

United States Patent
Lee et al.

(10) Patent No.: US 7,129,952 B2
(45) Date of Patent: Oct. 31, 2006

(54) CORE LOGIC CIRCUIT OF COMPUTER SYSTEM CAPABLE OF ACCELERATING 3D GRAPHICS

(75) Inventors: Ruen-Rone Lee, Hsin-Chu (TW); Chien-Chung Hsiao, Pang-Hu County (TW); Lin-Tien Mei, Hsin-Chu County (TW); Hung-Ta Pai, Tai-Chung County (TW)

(73) Assignee: Silicon Integrated Corp., Hsinchu (TW)

(*) Notice: Subject to any disclaimer, the term of this patent is extended or adjusted under 35 U.S.C. 154(b) by 272 days.

(21) Appl. No.: 10/176,398

(22) Filed: Jun. 21, 2002

(65) Prior Publication Data

US 2003/0005205 A1    Jan. 2, 2003

(30) Foreign Application Priority Data

Jun. 22, 2001    (TW) .............................. 90115353 A

(51) Int. Cl.
G06F 13/14    (2006.01)
G06F 15/16    (2006.01)

(52) U.S. Cl. ...................................... 345/520; 345/502

(58) Field of Classification Search ................ 345/520, 345/502–506, 519, 522, 531, 419, 426, 427; 710/305–307, 309, 313
See application file for complete search history.

(56) References Cited

U.S. PATENT DOCUMENTS

| 5,867,180 | A | * | 2/1999 | Katayama et al. | 345/542 |
| 6,040,845 | A | * | 3/2000 | Melo et al. | 345/520 |
| 6,092,124 | A | * | 7/2000 | Priem et al. | 710/23 |
| 6,232,990 | B1 | * | 5/2001 | Poirion | 345/519 |
| 6,268,875 | B1 | * | 7/2001 | Duluk et al. | 345/506 |
| 6,621,760 | B1 | * | 9/2003 | Ahmad et al. | 365/233 |
| 6,624,817 | B1 | * | 9/2003 | Langendorf | 345/520 |
| 6,630,936 | B1 | * | 10/2003 | Langendorf | 345/520 |
| 6,859,208 | B1 | * | 2/2005 | White | 345/542 |
| 2002/0171652 | A1 | * | 11/2002 | Perego | 345/542 |

* cited by examiner

*Primary Examiner*—Kee M. Tung
(74) *Attorney, Agent, or Firm*—Lowe Hauptman & Berner, LLP

(57) ABSTRACT

A core logic circuit which works with a CPU and a main graphics accelerator in a computer system is provided. The core logic chip includes a host controller electrically connected to the CPU for receiving a command from the CPU; an auxiliary graphing engine electrically connected to the host controller for receiving and processing the command; and a transmission controller electrically connected to the auxiliary graphing engine for transmitting the command that is processed and outputted by the auxiliary graphing engine to the main graphics accelerator to be further processed.

12 Claims, 7 Drawing Sheets

US 7,129,952 B2

CORE LOGIC CIRCUIT OF COMPUTER SYSTEM CAPABLE OF ACCELERATING 3D GRAPHICS

FIELD OF THE INVENTION

The present invention relates to a core logic circuit of a computer system, and more particularly to a core logic circuit capable of accelerating 3D graphics. The present invention also relates to a process for coordinating the 3D graphics operations of a core logic circuit and a 3D graphics accelerator in a computer system

BACKGROUND OF THE INVENTION

In a typical computer system of FIG. 1, a core logic circuit 13 such as a chipset, is widely used to control data flows among a central processing unit (CPU) 11, a system memory 12, and a plurality of I/O devices including a 3D graphics accelerator 14 and other I/O devices 15. For example, the CPU 11 accesses data of a system memory 12 or outputs graphing commands to the 3D graphics accelerator 14 via the core logic circuit 13. The system memory, for example, is a dynamic random access memory (DRAM). The core logic circuit 13 includes several interface controllers such as a host controller 130, a DRAM controller 131, an AGP/PCI controller 132 and other I/O interface controllers 133, as can be seen in FIG. 2, The interface controllers 130, 131, 132 and 133 are employed for controlling data exchange between the core logic circuit 13 and respectively the CPU 11, the system memory 12, the 3D graphics accelerator 14 and other I/O devices 15. In general, data flows through different buses to be used. For example, the CPU 11 accesses memory data through a host bus and a memory bus (not shown). Since the newly developed buses, e.g. a USB or an IEEE 1394 interface, are specified for different applications, the pad number of the core logic circuit 13 is large for complying with the requirements. Therefore, a large area of the core logic circuit is required for accommodating the large number of pads. Under this circumstance, although the control circuits of the buses require extremely small area for current semiconductor manufacturing technology, the area of the core logic circuit could not be reduced correspondingly. Such occurrence is called a "pad-limited" phenomenon.

On the other hand, with the increasing demand of 3D graphics, a part of the 3D graphics accelerating task is transferred from the CPU to the 3D graphics accelerator. Therefore, the 3D graphics accelerator 14 becomes larger than ever. Referring to FIG. 3(a), the 3D graphics accelerator 14 generally includes a geometry engine 141 and a rendering engine 142. The geometry engine 141 and the rendering engine 142 are used for doing the transform/lighting and setup/rendering operations, respectively. The geometry engine 141 and the rendering engine 142 are incorporated in a single chip for improving 3D graphics performance. In addition, nowadays, multiple pipelines are widely used in the rendering operation to improve the rending throughput. Therefore, much more logical gates are required to be installed in the 3D graphics accelerator 14, which increases the cost of the 3D graphics accelerator 14. FIG. 3(b) illustrates another design of the 3D graphics accelerator 14. Since the processing speeds of the geometry engine 141 and the rendering engine 142 are different in some cases, a local DRAM 16 for supporting the rendering operation as shown in FIG. 3(a), is provided for buffering the output of the geometry engine 141 so as to prevent such engines from being idle. As known, a sufficient memory bandwidth is required for the operation of the rendering engine 142. The share of the local DRAM as described above might impair the performance of the rendering engine 142 due to the reduction of the memory bandwidth provided for the rendering operation.

SUMMARY OF THE INVENTION

It is an object of the present invention to provide an apparatus for accelerating 3D graphics, in which the geometry engine of the 3D graphics accelerator is embedded into the core logic circuit so as to reduce the cost of the graphics accelerator and make use of the area of the core logic circuit.

It is a further object of the present invention to provide an apparatus for accelerating 3D graphics, in which the system memory is provided for buffering the output of the geometry engine in order not to occupy the memory bandwidth of the local memory, and adversely affect the performance of the rendering engine.

In accordance with a first aspect of the present invention, a core logic chip, which works with a CPU and a main graphics accelerator in a computer system, comprises a host controller electrically connected to the CPU for receiving a command from the CPU; an auxiliary graphing engine electrically connected to the host controller for receiving and processing the command; and a transmission controller electrically connected to the auxiliary graphing engine for transmitting the command that is processed and outputted by the auxiliary graphing engine to the main graphics accelerator to be further processed.

In general, the core logic chip further comprises an interface controller electrically connected to the host controller and I/O devices for interfacing therebetween.

Preferably, the transmission controller is an AGP/PCI bus controller.

In general, the core logic chip further comprises a control circuit electrically connected to the host controller and the auxiliary graphing engine for outputting a control signal to control the transmission of command in the auxiliary graphing engine.

In an embodiment, the auxiliary graphing engine, which is a 3D engine, includes: a demultiplexer receiving a graphing command from the host controller in response to the control signal; a transform and lighting unit receiving said graphing command from said demultiplexer and performing a converting and brightness-controlling operation in response to the graphing command; and a multiplexer selecting a signal from one of both, the demultiplexer and the transform and lighting unit, to be outputted to the transmission controller.

In general, the core logic chip further comprises a system memory controller electrically connected to the host controller and a system memory for accessing data, Generally, the system memory is a DRAM.

Preferably, the auxiliary graphing engine her includes a primitive sorter for receiving the output signal of the demultiplexer, and storing the sorted data to the system memory via the system memory controllers and the data in the system memory is accessed by the transform and lighting unit via the system memory controller.

In accordance with a second aspect of The present invention, there is provided a core logic circuit of a computer system. The core logic circuit included an interface controller portion, a graphing engine and a control circuit. The interface controller portion includes a host controller, a memory controller and an AGP/PCI bus controller for controlling data exchange with a CPU, a system memory and a graphics accelerator, respectively. The graphing engine is electrically connected between the host controller and the AGP/PCI bus controller, and in response to a first graphing command from the CPU, performing a first graphing operation to realize a second graphing command prior to a second graphing operation performed by the graphic accelerator. The control circuit is electrically connected between the host controller and the AGP/PCI bus controller for controlling whether the first graphing command flows to the graphics accelerator via the graphing engine.

In an embodiment, the core logic circuit further includes a first demultiplexer and a first multiplexer. The first demultiplexer is electrically connected to the host controller for receiving the first graphing command from the CPU via the host controller, and outputting the first graphing command to either of the graphing engine and the AGP/PCI bus controller. The first multiplexer is electrically connected to the graphing engine, the first demultiplexer and the AGP/PCI bus controller for selecting one of both, the first graphing command and the second graphing command, to be outputted to the AGP/PCI bus controller, wherein the first demultiplexer and the first multiplexer are respectively controlled by a first control signal and a second control signal of the control circuit.

In an embodiment, the core logic circuit further includes a data flow control unit between the graphing engine and the first multiplexer, wherein the data flow control unit comprises a second demultiplexer and a second multiplexer, interconnected with each other and both electrically connected to the memory controller, for determining the second graphing command to be outputted to either one of the system memory and the graphing accelerator via the memory controller and the AGP/PCI bus controller, respectively, and the second demultiplexer and the second multiplexer are respectively controlled by a third control signal and a fourth control signal of the control circuit, Preferably, the graphics accelerator is a 3D graphics accelerator, and the graphing engine is a geometry engine for performing a transform/lighting operation. The geometry engine finer comprises a primitive sorter for re-ordering 3D primitives in accordance with depth information.

In accordance with a third aspect of the present invention, there is provided an apparatus for accelerating 3D graphics. The apparatus includes a core logic circuit and a 3D graphics accelerator. The core logic circuit, which is electrically connected to a CPU and a system memory, has a 3D geometry engine for performing a first graphics operation. The 3D graphics accelerator, which is electrically connected with the core logic circuit via an I/O bus, has a rendering engine for performing a second graphics operation.

Preferably, the first graphics operation includes a transform and lighting operation, and optionally a sorting operation. The second graphics operation includes a setup and rendering operation.

In accordance with a fourth aspect of the present invention, a method for processing a graphing command in a computer system comprises steps of: outputting a command from a CPU of the computer system; and receiving the command by an auxiliary graphing engine, which is located in a core logic circuit of the computer system, processing a portion of the command, and outputting the command to a main graphing accelerator of the computer system to be further processed.

Preferably, the auxiliary graphing engine is disposed in a core logic chip of the computer system, and communicated with the main graphing accelerator via an AGP/PCI bus.

In accordance with a fifth aspect of the present invention, there is provided a process for coordinating 3D graphics operations of a core logic circuit and a 3D graphics accelerator in, a computer system, wherein data of the core logic circuit and the 3D graphics accelerator is respectively stored in a system memory and a local memory, and each the core logic circuit and the 3D graphics accelerator having a 3D geometry engine. The process includes steps of detecting respective access conditions of the system memory and the local memory, and starting the 3D geometry engine of a selected one of the core logic circuit and the 3D graphics accelerator to perform a graphics operation according to the access conditions.

In an embodiment, the graphics operation is performed by the 3D geometry engine of the 3D graphics accelerator if the system memory is detected to be busier than the local memory, and the graphics operation is performed by the 3D geometry engine of the core logic circuit if the local memory is busier than the system memory.

Preferably, the detecting step is performed once a frame or a scene.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3($b$) is a block diagram illustrating another 3D graphics accelerator in the prior art;

DETAILED DESCRIPTION OF THE PREFERRED EMBODIMENT

Figure 1:
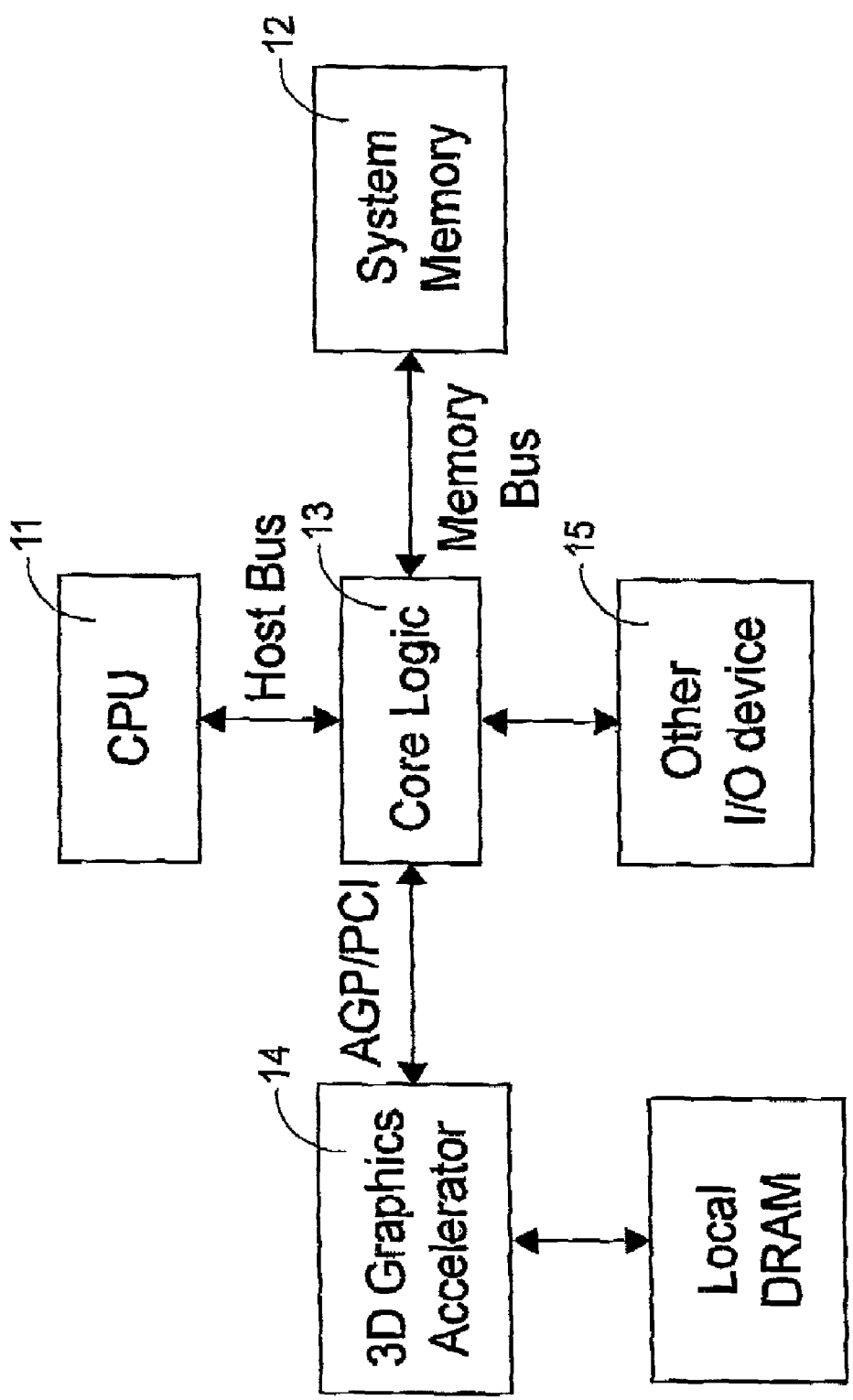
FIG. 1 is a block diagram of a typical computer system.
Figure 2:
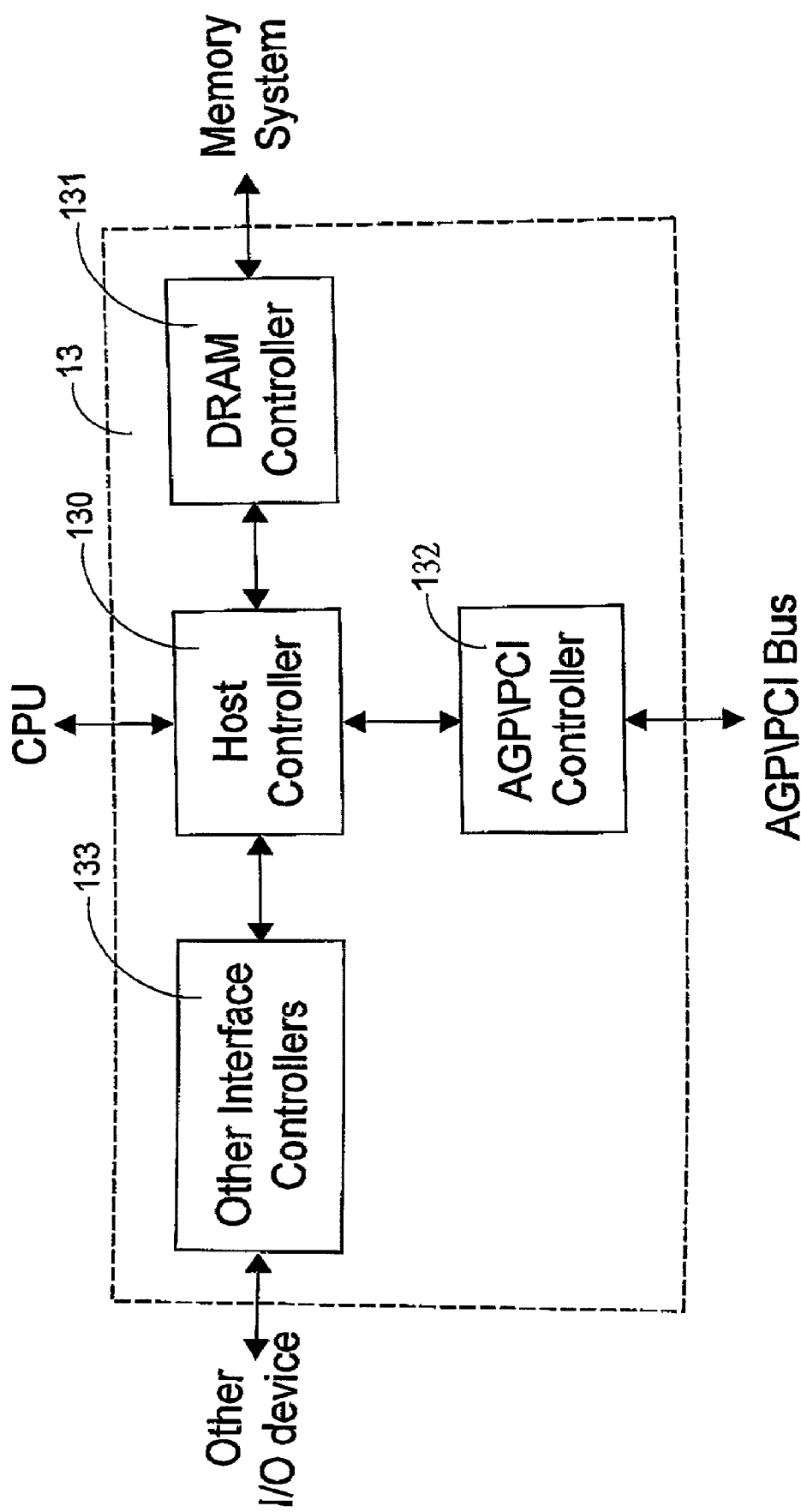
FIG. 2 is a block diagram illustrating the architecture of the core logic circuit in FIG. 1.
Figure 3A:
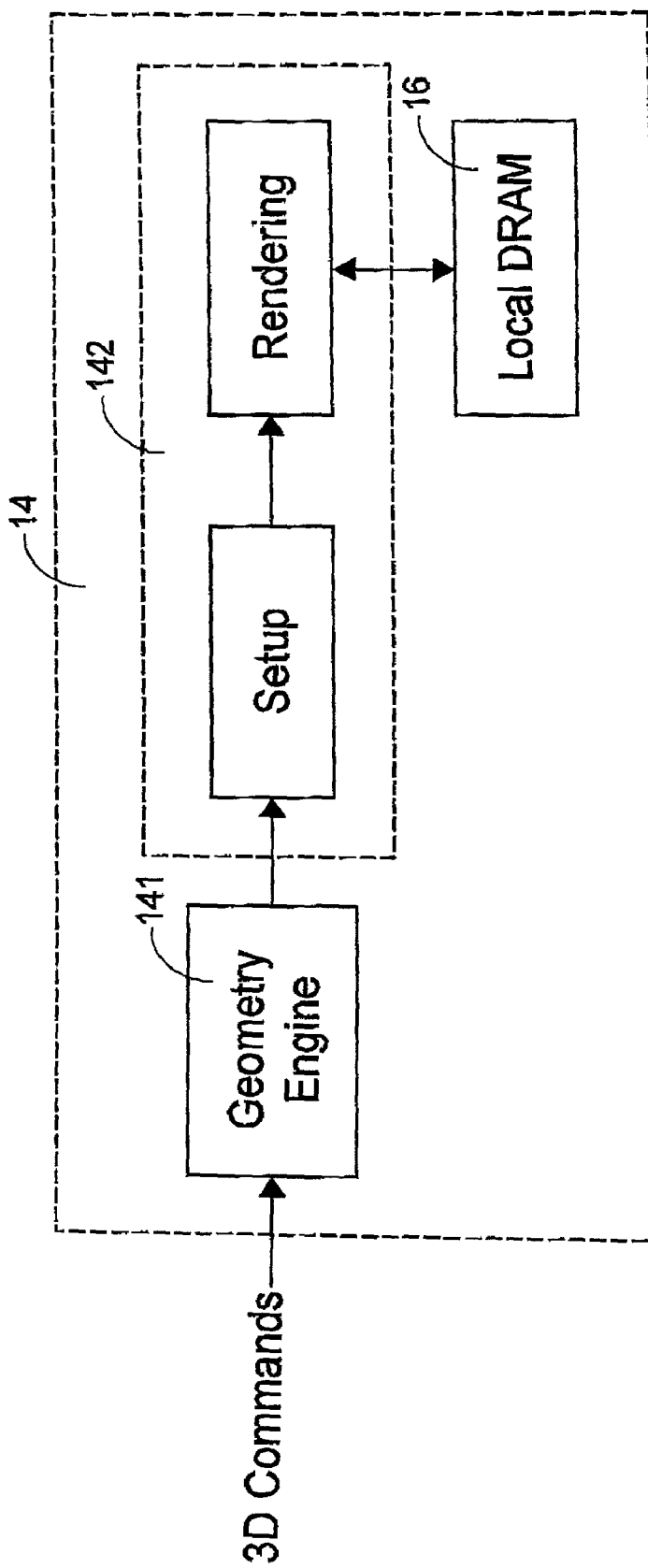
FIG. 3($a$) is a block diagram illustrating a 3D graphics accelerator in the prior art.
Figure 3B:
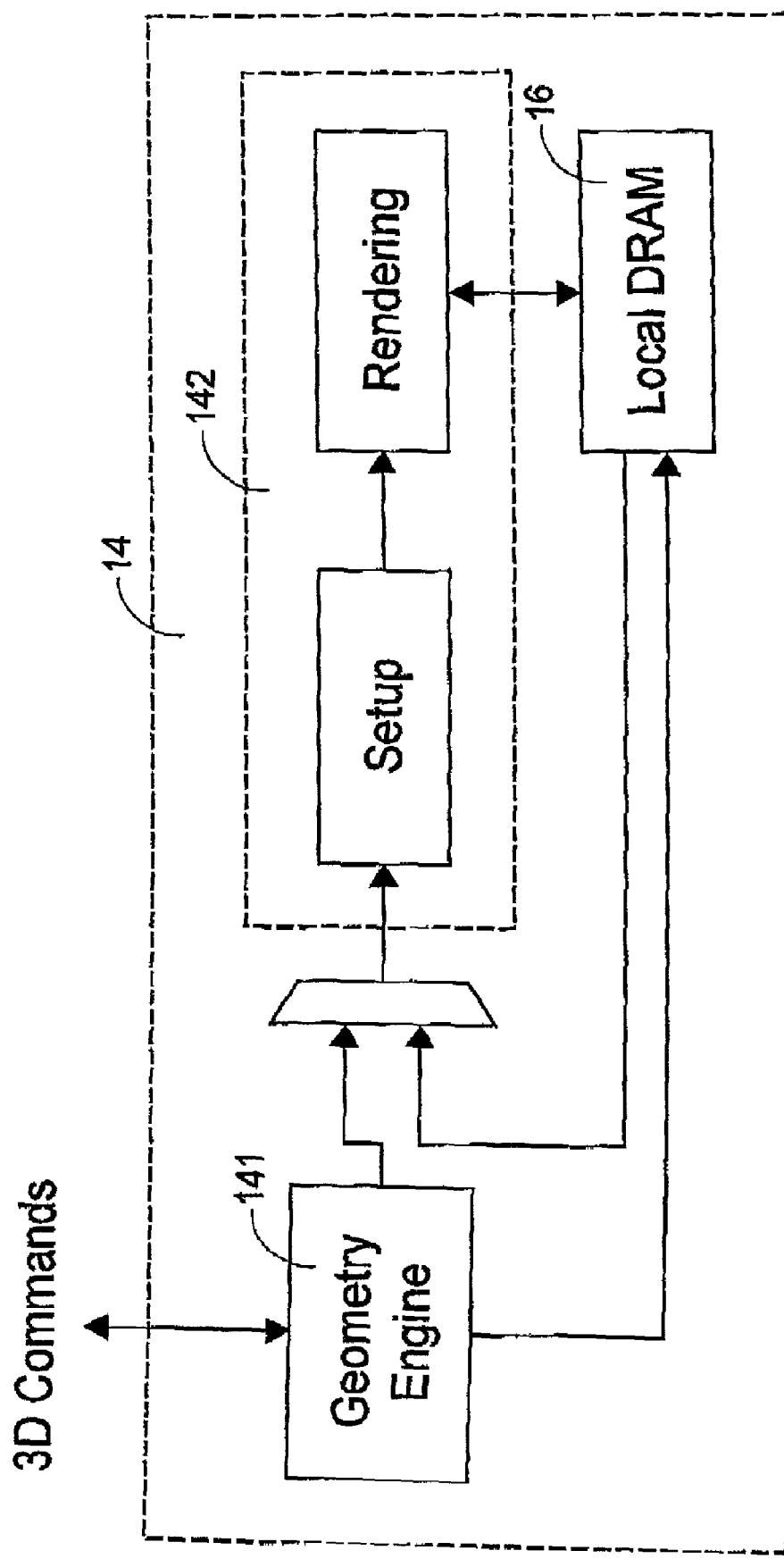
Figure 4:
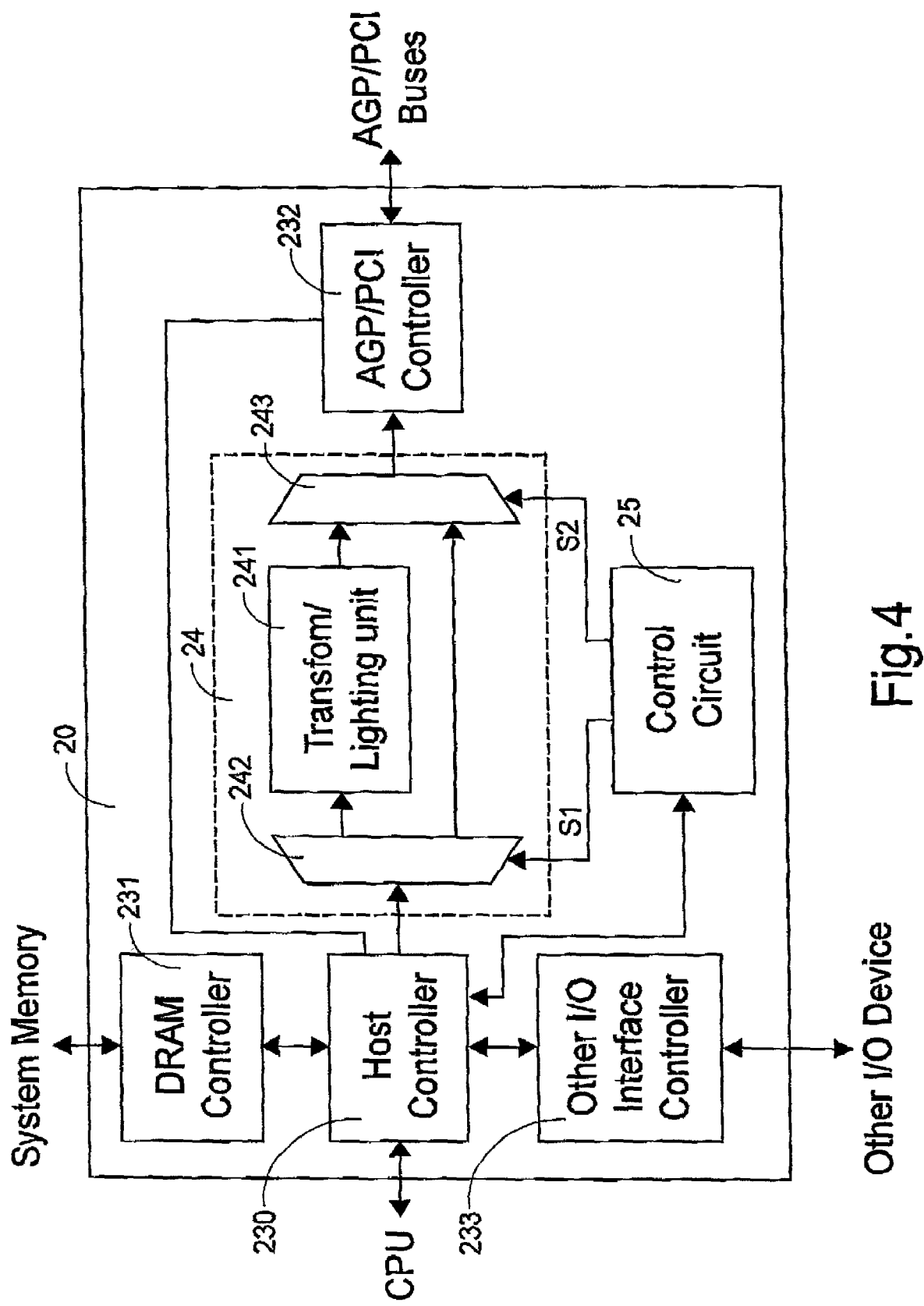
FIG. 4 is a block diagram illustrating a core logic circuit according to a first preferred embodiment of the present invention.

Referring to FIG. 4, a core logic circuit 20 according to a first preferred embodiment of the present invention includes an interface controller portion, a geometry engine 24 and a control circuit 25. The interface controller portion includes the similar controllers in FIG. 1, for example, a host controller 230, a DRAM controller 231, an AGP/PCI controller 232 and other I/O interface controllers 233, which are used for controlling data exchange with a CPU, a system memory, a graphics accelerator (not shown) and other I/O interfaces, respectively. A demultiplexer 242 is electrically connected to the host controller 230 for receiving a first graphing command from the CPU via the host controller 230, and outputting the first graphing command to either of the transforming/lighting (T/L) unit 241 and the AGP/PCI controller 232. A transform/lighting operation is performed by the geometry engine 24 so as to realize a second graphing command prior to a setup/rendering operation performed by the graphic accelerator. A multiplexer 243 is electrically connected to the T/L unit 241, the demultiplexer 242 and the AGP/PCI controller 232 for selecting one of the first graphing command and the second graphing command to be outputted to AGP/PCI controller 232. Moreover, the demultiplexer 242 and the multiplexer 243 are respectively controlled by a first control signal S1 and a second control signal S2 of the control circuit 25 for controlling whether the first graphing command flows to the geometry accelerator via the geometry engine 24. It is of course that the control circuit 25 can also include registers for storing these control signals.

Since the transform/lighting operation is performed by the geometry engine 24 of the core logic circuit 20, the transform/lighting operation will be no longer required to be done by the CPU. In addition, the architecture for performing transform/lighting operation could be removed from the graphics accelerator. Therefore, the cost of the 3D graphics accelerator is dramatically reduced without impairing the graphics functions of the whole computer system. Since the core logic 20 is pad-limited, the extra gates can be utilized for installing the geometry engine 24 and make use of the area of the core logic circuit 20.

Figure 5:
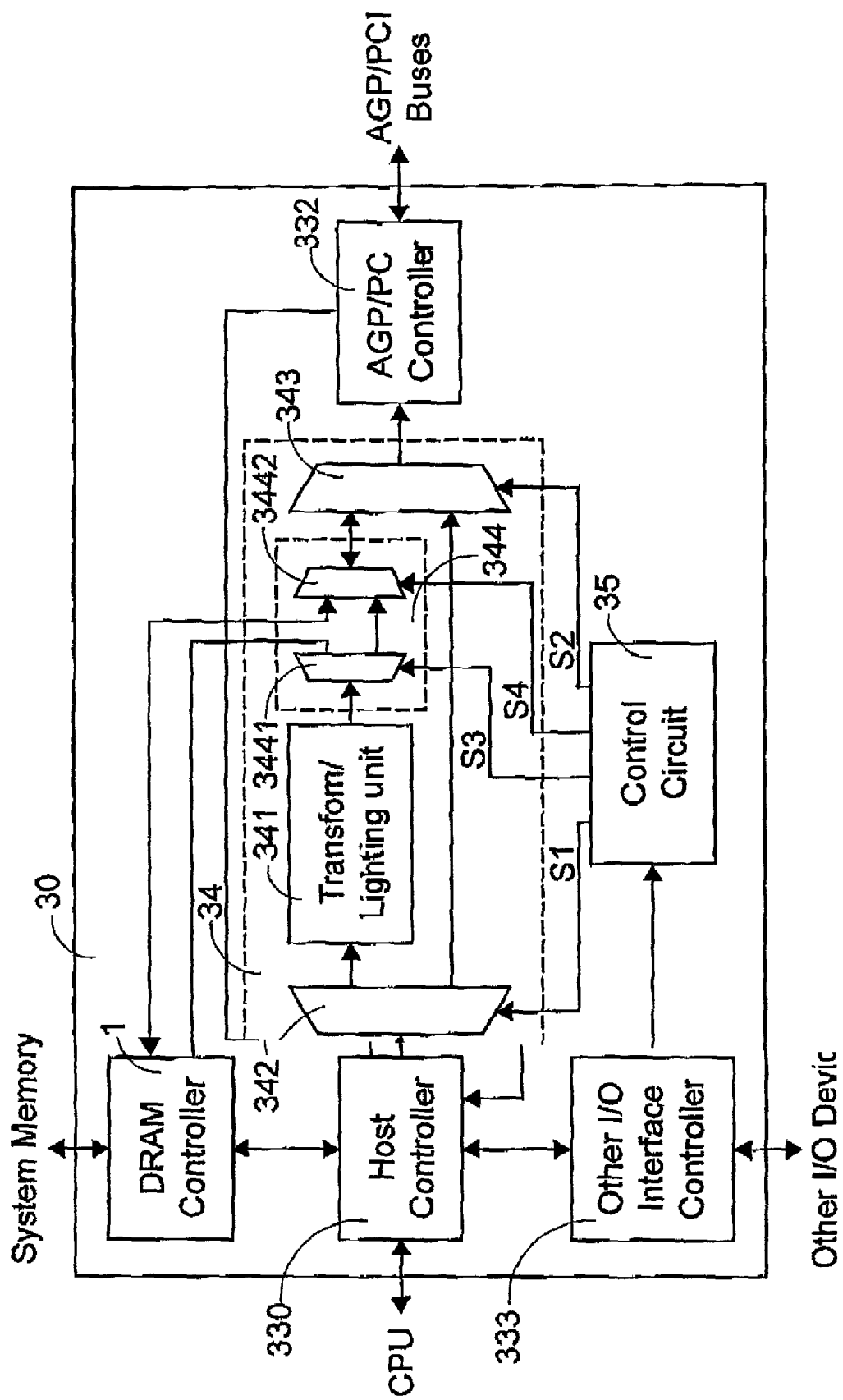
FIG. 5 is a block diagram illustrating core logic circuit according to a second preferred embodiment of the present invention.

Referring to FIG. 5, a core logic circuit 30 according to a second preferred embodiment of the present invention also includes an interface controller portion, a geometry engine 34 and a control circuit 35. The interface controller portion includes the similar controllers in FIG. 4, e.g. a host controller 330, the DRAM controller 331, an AGP/PCI controller 332 and other I/O interface controllers 333. The core logic circuit firmer includes a first demultiplexer 342 and a first multiplexer 343. A data flow control unit 344 is provided between the T/L unit 341 and the multiplexer 343. The data flow control unit 344 includes a second demultiplexer 3441 and a second multiplexer 3442, which are interconnected with each other and both electrically connected to the memory controller 331 for determining the second graphing command to be outputted to either one of the system memory and the graphing accelerator via the memory controller 331 and the AGP/PCI controller 332, respectively. The second demultiplexer 3441 and the second multiplexer 3442 are respectively controlled by a third control signal S3 and a fourth control signal S4 of the control circuit 35. Similarly, the control circuit 35 can also includes registers for storing these control signals.

It is noted second graphing command can be optionally stored in the system memory through the DRAM controller 331 and, if desired, it will be retrieved. Therefore, the processing speed of geometry engine 34 can match the graphics accelerator so as to avoid being idle. Since the system memory is provided for buffering the output of the geometry engine, the memory bandwidth of the local memory will not be fully occupied, and the performance of the rendering engine will not be adversely affected.

Certainly, the geometry engine 24/34 can have other functions in 3D graphics. For example, a primitive sorter can re-order 3D primitives in accordance with their depth information, and discard the covered triangles. Thus, only the visible primitives will be saved and passed to the next stage, which prevent the graphics accelerator from memory bound and thus enhance its performance.

Figure 6:
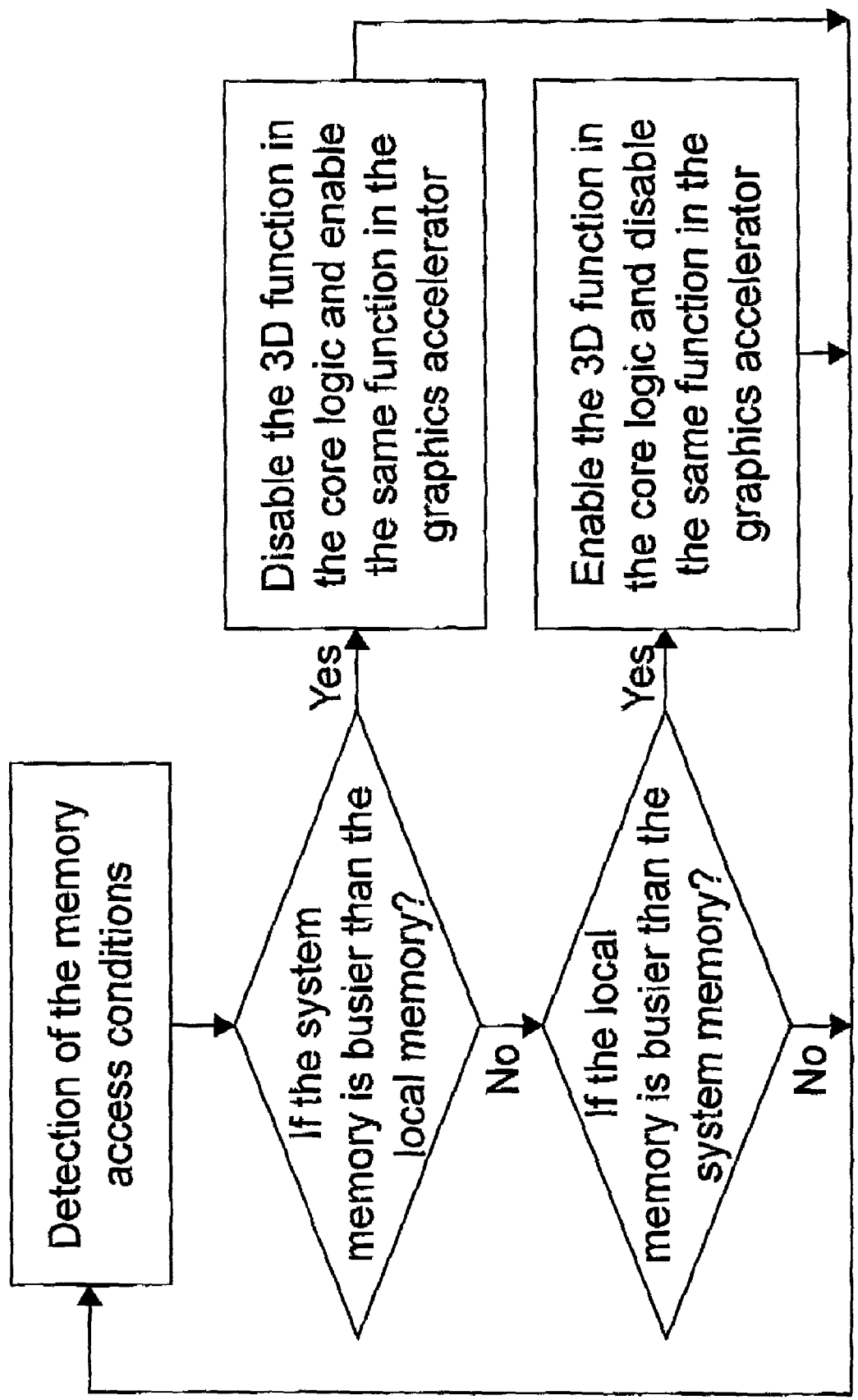
FIG. 6 is a flow chart illustrating a process for coordinating 3D graphics operations of a core logic circuit and a 3D graphics accelerator in a computer system according to a preferred embodiment of the present invention.

If the 3D graphics accelerator of a computer system has a geometry engine with the same functions as that in the core logic circuit of the present invention, it is desirable to provide a process for coordinating 3D graphics operations of a core logic circuit and a 3D graphics accelerator in a computer system, thereby obtaining the highest throughout of the 3D graphing commands. The process of the present invention includes steps of detecting respective access conditions of the system memory and the local memory, and starting the 3D geometry engine of a selected one of the core logic circuit and the 3D graphics accelerator to perform a graphics operation according to the access conditions. The detection can be done once per frame or per scene. For illustration, the flow chart is shown in FIG. 6. If the system memory is busier than the local memory, the graphics operation is performed by the 3D geometry engine of the 3D graphics accelerator. If the local memory is busier than the system memory, the graphics operation is performed by said 3D geometry engine of the core logic circuit.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A core logic chip, which works with a CPU and a main graphics accelerator in a computer system, comprising:
   a host controller electrically connected to said CPU for receiving a command from said CPU;
   an auxiliary graphing engine electrically connected to said host controller for receiving and processing said command;
   a transmission controller electrically connected to said auxiliary graphing engine for transmitting said command that is processed and outputted by said auxiliary graphing engine to said main graphics accelerator to be further processed; and
   wherein said auxiliary graphing engine, which is a 3D engine, includes:
      a demultiplexer receiving a graphing command from said host controller in response to a control signal;
      a transform and lighting unit receiving said graphing command from said demultiplexer and performing a converting and brightness-controlling operation in response to said graphing command; and
      a multiplexer selecting a signal from one of both, said demultiplexer and said transform and lighting unit, to be outputted to said transmission controller.

2. The core logic chip according to claim 1 wherein said control signal is generated by a control circuit of said core logic chip, which is electrically connected to said host controller and said auxiliary graphing engine.

3. The core logic chip according to claim 1 wherein said auxiliary graphing engine further includes a primitive sorter for receiving the output signal of said demultiplexer, and storing the sorted data to a system memory via a system memory controller of said core logic chip, and the data in said system memory is accessed by said transform and lighting unit via said system memory controller.

4. The core logic chip according to claim 3 wherein said system memory is a DRAM.

5. A core logic circuit comprising:
   an interface controller portion including a host controller, a memory controller and an AGP/PCI bus controller for controlling data exchange with a CPU, a system memory and a graphics accelerator, respectively;
   a graphic engine electrically connected between said host controller and said AGP/PCI bus controller, and in response to a first graphing command from said CPU, performing a first graphing operation to realize a second graphing command prior to a second graphing operation performed by said graphic accelerator;

a control circuit electrically connected between said host controller and said AGP/PCI bus controller for controlling whether said first graphing command flows to said graphics accelerator via said graphing engine;

a first demultiplexer electrically connected to said host controller for receiving said first graphing command from said CPU via said host controller, and outputting said first graphing command to either of said graphing engine and said AGP/PCI has controller; and a first multiplexer electrically connected to said graphing engine, said first demultiplexer and said AGP/PCI bus controller for selecting one of both, said first graphing command and said second graphing command, to be outputted to said AGP/PCI bus controller, wherein said first demultiplexer and said first multiplexer are respectively controlled by a first control signal and a second control signal of said control circuit.

6. The core logic circuit according to claim 5 further comprising a data flow control unit between said graphing engine and said first multiplexer, wherein said data flow control unit comprises a second demultiplexer and a second multiplexer, interconnected with each other and both electrically connected to said memory controller, for determining said second graphing command to be outputted to either one of said system memory and said graphing accelerator via said memory controller and said AGP/PCI bus controller, respectively, and said second demultiplexer and said second multiplexer are respectively controlled by a third control signal and a fourth control signal of said control circuit.

7. A process for coordinating 3D graphics operations of a core logic circuit with a first 3D geometry engine and a 3D graphics accelerator with a second 3D geometry engine in a computer system, data of said core logic circuit and said 3D graphics accelerator being respectively stored in a system memory and a local memory, said process comprising steps of:

detecting respective access conditions of said system memory and said local memory; and starting one of said first 3D geometry engine and said second 3D geometry engine to perform a graphics operation according to said access conditions.

8. The process according to claim 7 wherein said graphics operation includes a transform and lighting operation.

9. The process according to claim 7 wherein said graphics operation includes transform, lighting and sorting operations.

10. The process according to claim 7 wherein said graphics operation is performed by said second 3D geometry engine of said 3D graphics accelerator if said system memory is detected to be busier than said local memory, and said graphics operation is performed by said first 3D geometry engine of said core logic circuit if said local memory is busier than said system memory.

11. The process according to claim 7 wherein said detecting step is performed once per frame.

12. The process according to claim 7 wherein said detecting step is performed once per scene.

* * * * *